(12) United States Patent
Skinner et al.

(10) Patent No.: US 9,478,146 B2
(45) Date of Patent: Oct. 25, 2016

(54) METHOD AND SYSTEM FOR CAPTURING READING ASSESSMENT DATA

(71) Applicant: Xerox Corporation, Norwalk, CT (US)

(72) Inventors: Gary W. Skinner, Rochester, NY (US); Robert M. Lofthus, Webster, NY (US); Dusan G. Lysy, Fairport, NY (US); Michael Robert Furst, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 214 days.

(21) Appl. No.: 13/783,558

(22) Filed: Mar. 4, 2013

(65) Prior Publication Data

US 2014/0248591 A1 Sep. 4, 2014

(51) Int. Cl.
*G09B 17/00* (2006.01)
*G09B 7/06* (2006.01)

(52) U.S. Cl.
CPC ...................................... *G09B 7/063* (2013.01)

(58) Field of Classification Search
CPC ...................................................... G09B 17/00
USPC .......................................................... 434/178
See application file for complete search history.

(56) References Cited

U.S. PATENT DOCUMENTS

| | | | |
|---|---|---|---|
| 4,164,078 A | 8/1979 | Goldfarb | |
| 4,261,241 A | 4/1981 | Gould et al. | |
| 4,464,118 A | 8/1984 | Scott et al. | |
| 4,793,810 A | 12/1988 | Beasley, Jr. | |
| 5,281,146 A | 1/1994 | Janney | |
| 5,387,107 A | 2/1995 | Gunter et al. | |
| 5,730,602 A | 3/1998 | Gierhart et al. | |
| 5,794,249 A * | 8/1998 | Orsolini et al. | ............... 704/200 |
| RE36,028 E | 1/1999 | Deesen et al. | |
| 6,011,949 A | 1/2000 | Shimomukai | |
| 6,118,973 A | 9/2000 | Ho et al. | |

(Continued)

FOREIGN PATENT DOCUMENTS

| | | |
|---|---|---|
| EP | 0556530 A1 | 8/1993 |
| JP | 2000123115 A | 4/2000 |
| WO | WO-9832107 A1 | 7/1998 |
| WO | WO-0221259 A1 | 3/2002 |
| WO | WO-2004090834 A2 | 10/2004 |

OTHER PUBLICATIONS

Dymetman et al., "Intelligent Paper", Xerox Research Centre Europe, Meylan, France, Electronic Publishing, Artistic Imaging, and Digital Typography, Lecture Notes in Computer Science, vol. 1375, 1998, pp. 392-406.

(Continued)

*Primary Examiner* — Robert J Utama
*Assistant Examiner* — Elroy S Crocker
(74) *Attorney, Agent, or Firm* — Fox Rothschild LLP

(57) ABSTRACT

A method and system for assessing a student's reading ability is disclosed. An image-capturing device detects, from a worksheet comprising a position-identifying pattern, a first mark in a first region of the worksheet. The first mark is in a first indicator portion of the position-identifying pattern contained within a first indicator region that is associated with a first word. The image-capturing device detects a first note in a note region of the worksheet. Based on whether the first mark, the first note, or both indicates that the first word was read incorrectly or correctly, a processor determines a first reading assessment result for the first word and stores, in a memory, a digital document file comprising the first reading assessment result.

21 Claims, 6 Drawing Sheets

(56) References Cited

U.S. PATENT DOCUMENTS

| | | | |
|---|---|---|---|
| 6,154,757 | A | 11/2000 | Krause et al. |
| 6,208,771 | B1 | 3/2001 | Jared et al. |
| 6,215,901 | B1 | 4/2001 | Schwartz |
| 6,515,690 | B1 | 2/2003 | Back et al. |
| 6,606,479 | B2 | 8/2003 | Cook et al. |
| 6,673,611 | B2 | 1/2004 | Thompson et al. |
| 6,678,499 | B1* | 1/2004 | Silverbrook ......... B41J 2/17503 434/350 |
| 6,759,206 | B1 | 7/2004 | Rubin et al. |
| 6,953,343 | B2 | 10/2005 | Townshend |
| 7,036,075 | B2 | 4/2006 | Walker |
| 7,147,473 | B2 | 12/2006 | Harpaz |
| 7,618,259 | B2 | 11/2009 | Manos |
| 7,734,652 | B2 | 6/2010 | Tamayo et al. |
| 7,831,933 | B2 | 11/2010 | Marggraff et al. |
| 7,853,193 | B2 | 12/2010 | Marggraff |
| 1,015,947 | A1 | 6/2011 | Hradek et al. |
| 8,226,416 | B2* | 7/2012 | Abrash et al. ................ 434/185 |
| 8,261,967 | B1* | 9/2012 | Long et al. .................... 235/375 |
| 2002/0087560 | A1 | 7/2002 | Bardwell |
| 2003/0001020 | A1 | 1/2003 | Kardach |
| 2003/0180703 | A1 | 9/2003 | Yates et al. |
| 2004/0093346 | A1 | 5/2004 | Hochman |
| 2005/0024346 | A1* | 2/2005 | Dupraz .............. G06F 3/03545 345/179 |
| 2005/0114160 | A1 | 5/2005 | Boehme et al. |
| 2006/0018544 | A1* | 1/2006 | Ohguro .......................... 382/181 |
| 2006/0216683 | A1 | 9/2006 | Goradia |
| 2006/0256371 | A1 | 11/2006 | King et al. |
| 2007/0160971 | A1* | 7/2007 | Caldera ................... G09B 7/00 434/353 |
| 2008/0108035 | A1 | 5/2008 | Warda |
| 2008/0264701 | A1 | 10/2008 | Radtke et al. |
| 2008/0286732 | A1 | 11/2008 | German et al. |
| 2009/0002345 | A1* | 1/2009 | Burstrom ................ G06F 3/167 345/179 |
| 2009/0202971 | A1 | 8/2009 | Cortez |
| 2009/0204821 | A1 | 8/2009 | Fransson et al. |
| 2009/0246744 | A1 | 10/2009 | Lofthus et al. |
| 2009/0271433 | A1 | 10/2009 | Perronnin et al. |
| 2010/0047758 | A1 | 2/2010 | McCurry et al. |
| 2010/0075290 | A1 | 3/2010 | DeYoung et al. |
| 2010/0075291 | A1 | 3/2010 | DeYoung et al. |
| 2010/0075292 | A1* | 3/2010 | DeYoung et al. ............. 434/350 |
| 2010/0157345 | A1 | 6/2010 | Lofthus et al. |
| 2010/0159432 | A1 | 6/2010 | German et al. |
| 2010/0159437 | A1 | 6/2010 | German et al. |
| 2010/0159438 | A1 | 6/2010 | German et al. |
| 2010/0227306 | A1 | 9/2010 | Lofthus et al. |
| 2012/0021398 | A1 | 1/2012 | Venable |
| 2012/0118964 | A1 | 5/2012 | Kindberg et al. |
| 2012/0141967 | A1 | 6/2012 | German et al. |
| 2012/0282587 | A1 | 11/2012 | Lofthus et al. |
| 2015/0161903 | A1* | 6/2015 | Colliander ............... G09B 7/06 434/350 |

OTHER PUBLICATIONS

"Introduction to the Livescribe Platform", Livescribe SDKs, copyright 2007-2010 Livescribe Inc., Dec. 20, 2010, 11:58 a.m.

Sebastian Wren, Ph.D. and Jennifer Watts, Ph.D., "The Abecedarian Reading Assessment", copyright 2002.

Chuat, "CategoriX & ClusteriX", Xerox Research Centre Europe, licensing@xrce.xerox.com (May 2005).

* cited by examiner

METHOD AND SYSTEM FOR CAPTURING READING ASSESSMENT DATA

BACKGROUND

Education testing and skills assessment is an important aspect of childhood education. In the context of reading, the de facto method to assess a student's reading ability is the running record. A conventional running record has been a paper and pencil work flow method for the teacher, involving a specialized shorthand notation. The teacher uses a paper-based worksheet to mark data while a student is performing an assessment thus creating a "running record" of the child's reading performance. The running record tallies the student's accuracy in reading and the errors made.

While the teacher gains tacit knowledge about the student when capturing a running record, the process does not easily capture the breadth of possible data. It is only a paper record of the teacher's hand written markings and notes that they can make in real time, and it can vary based on the method used or the purpose for which it is gathered.

This document describes improved methods for gathering much more data during an assessment of a student's reading ability.

SUMMARY

A student reading performance assessment is disclosed. A position-identifying pattern which can be read by an image-capturing device is printed on a worksheet, along with other information useful for performing the student reading performance assessment. The worksheet also includes a number of indicator regions. Each region includes at least one indicator portion of the position-identifying pattern. A number of words are printed on the worksheet, each next to at least one of the indicator regions. A note region is also printed on the worksheet that includes a note portion of the position-identifying pattern.

The system also includes an image capturing device having a processor and a computer-readable memory with program instructions that, when executed, cause the processor to execute a method. This method is also described. The processor detects a first indicator portion of the position-identifying pattern that corresponds to a first mark in one of the indicator regions that is associated with a word. Based on whether the first mark indicates that the word was read incorrectly or correctly, the processor determines a first reading assessment result for the first word. A digital document file is stored, by the processor, in a memory. The digital document file includes the first reading assessment result.

DETAILED DESCRIPTION

Figure 1:
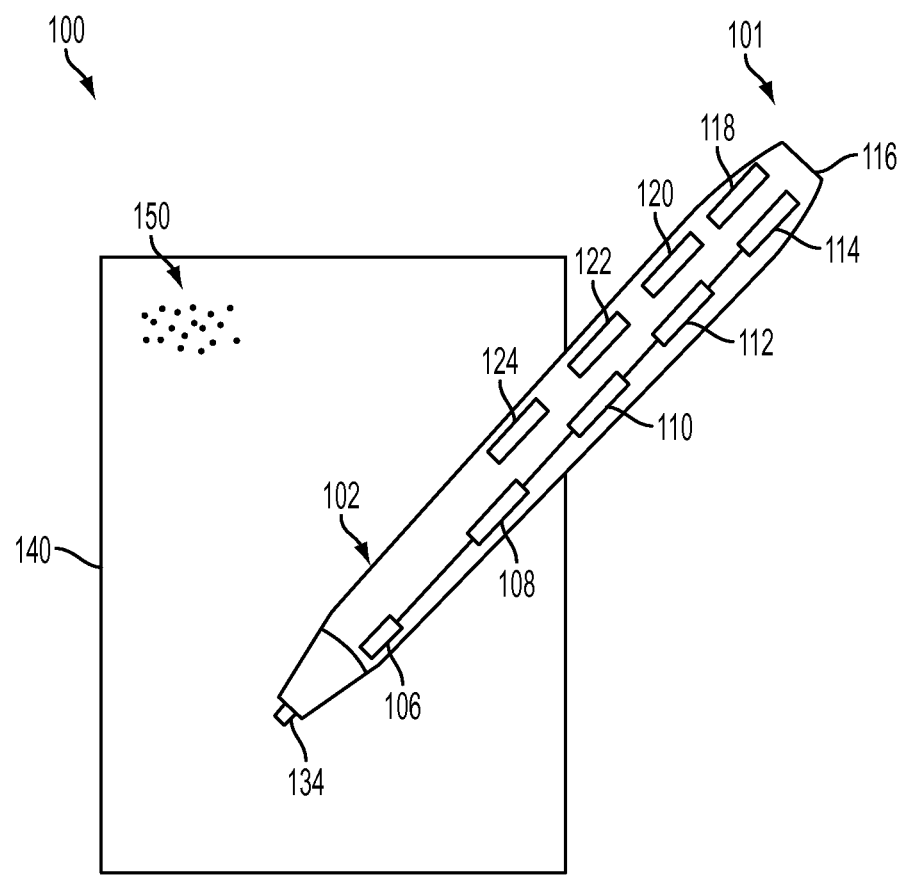
FIG. 1 is a diagram of an image capture system that includes intelligent paper and a smart pen.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used in this document, a statement that a device or system is "in electronic communication with" another device or system means that devices or systems are configured to send data, commands and/or queries to each other via a communications network. The network may be a wired or wireless network such as a local area network, a wide area network, an intranet, the Internet or another network.

A "computing device" refers to a computer, a processor and/or any other component, device or system that performs one or more operations according to one or more programming instructions. The term "data" may refer to physical signals that indicate or include information.

An "image," as a pattern of physical light or a collection of data representing the physical light, may include characters, words, symbologies, graphics and other features, as well as combinations thereof. A "digital image" is by extension an image represented by a collection of digital data. A "digital document" is by extension a document represented by a collection of digital data.

A "digital pen" refers to an input device that is capable of both writing on a substrate and capturing data corresponding to the user's handwriting or strokes. The digital pen contains components that convert the handwritten markings into digital data which can be saved on a computer-readable storage medium. Digital pens may contain accelerometers that can detect the movement of the pen on the substrate. Digital pens may also include positional technology which can physically detect the location of the pen tip during the writing process. Other digital pens can use a camera or other image-capturing sensor to detect the position of the pen tip on special digital paper that includes position identifying information.

An "electronic device" refers to a device that includes an imaging device, a processor and tangible, computer-readable memory. The memory may contain programming instructions in the form of a software application that, when executed by the processor, causes the device to perform various operations according to the programming instructions. Examples of suitable devices include portable electronic devices such as smart phones, personal digital assistants, cameras, tablet devices, electronic readers, personal computers, media players, satellite navigation devices and the like.

This disclosure describes a system that combines digital pen, intelligent paper, and audio recording technologies to create a running record assessment that is capable of capturing teacher annotation and a variety of student response information. Specifically, the system is able to associate detailed teacher annotations with error indicator marks for specific words, to resynchronize the audio record of student reading with the teacher's pen marks, and to infer reading ability metrics from computer aided analysis of the pen marks and audio record of the running record session.

FIG. 1 illustrates an embodiment of an image capturing system. FIG. 1 shows various elements of a digital pen 101. A pen-shaped (e.g., elongated and/or tubular) housing 102 contains an image sensor 106 such as a camera or infrared sensor, a processor 108, a memory device 110, a transmitter 114, and/or a communications port 118. In some embodiments, the pen may include a display 120 and an audio sensor 122. The display may be an organic light-emitting diode (OLED) display, a sequence of lights, or any other display mechanism. The audio sensor may be a built in microphone and/or a port to which an external microphone may be attached. The audio sensor 122 is configured to allow recording of ambient sound, e.g. the sound of a student reading a written passage. The processor 108 is configured to store the recording as a digital audio file in the memory device 110.

An ink tip 134 extends from an end of the housing 116 and may be used to apply markings on a substrate 140 such as paper. Optionally, the pen may include a timing circuit 112 such as a clock circuit or an interface to an external clock. In some embodiments, the pen 101 may include a timing circuit 112 such as a clock circuit or an interface to an external clock. In some embodiments, the timing circuit 112 may be an independent circuit, programming or another means that enables the pen to track an elapsed time. The pen also may include a position sensor 124 such as an accelerometer or gyroscope.

The substrate 140 also may include an embedded position-identifying pattern 150. The position-identifying pattern 150 will be digitally-readable indicia, such as a pattern or series of codes that uniquely identifies the document and various locations on the document. In situations where the substrates are used for information collection forms, each form (or each type of form) may contain unique elements, and the pattern will vary throughout different locations on each worksheet. For example, the indicia that are printed on an area corresponding to a worksheet's first data field may be different from that printed on the area corresponding to a different data field.

The embedded pattern may be any printable or printed, machine-readable indicia that may be used to provide data to identify a document and a location on the document. For example, the data may take the form of a unique, skewed dot matrix pattern such as that described above. Instead of a pure matrix pattern, in which under typical circumstances each dot is printed at the point where the horizontal and vertical guide lines of the matrix intersect, each dot would be slightly set-off or "skewed" from its intersection. Such dot matrix patterns may be generated using technologies such as those available from Anoto, Inc. The digital pen can see these dots with its sensor, and use the dots to identify the substrate and the location of the pen on the substrate. Alternatively, the embedded data may include a series of glyph codes or other codes, such as glyph codes that are generated using the process of U.S. Pat. No. 6,208,771, the disclosure of which is incorporated herein by reference in its entirety.

Figure 2:
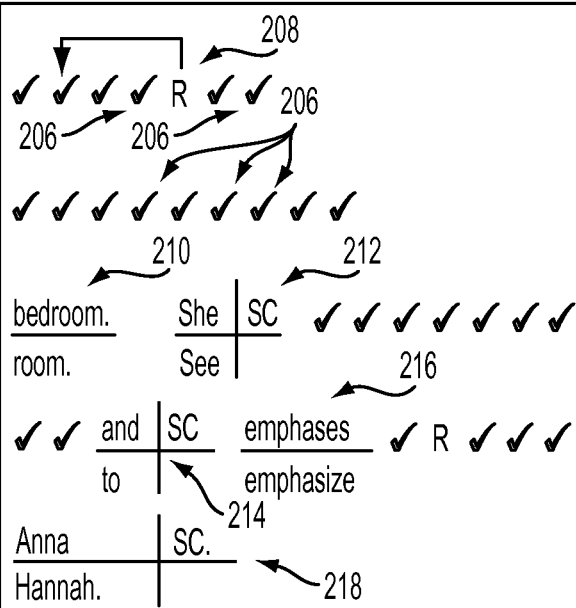
FIG. 2 shows an example of a conventional running record worksheet.

Referring now to FIG. 2, an example of a reading passage (box 202) and a teacher's running record notation (box 204) are shown. The reading passage is given to a student for reading aloud. The teacher then creates a "running record" of the student's reading performance with notations that allow the teacher to specify details of the student's abilities. As shown in box 204, the teacher makes a series of marks for each word in the reading passage. Most of the marks are check marks 206 that indicate the student's correct reading of that word.

Errors are indicated using other notations. For example, the "R" mark 208 indicates that the student re-read a portion of the reading passage. The arrow extending from mark 208 to a check mark three spaces before indicates that the student re-read the three previous words before continuing. Substantive errors (e.g., using the wrong word or misreading a word) are indicated by marks 210, 212, 214, 216, and/or 218. For example, an uncorrected error is indicated by mark 210 showing that the student said "bedroom" instead of the word written in the passage, i.e. "room." Mark 216 also illustrates an uncorrected error. Mark 212, in contrast, shows a self-corrected error, meaning the student recognized the error and corrected their reading of the word. In the example of mark 212, the student said the word "She" instead of the written word "See." The "SC" in the upper right corner of mark 212 indicates that that the error was self-corrected. Marks 214 and 218 also illustrate self-corrected errors. The system may use and recognize any suitable notation system, such as a unique system or the known systems of running record symbols and marking notations. Examples of running record symbols may be found at www.readinga-z.com, among other places.

Figure 3:
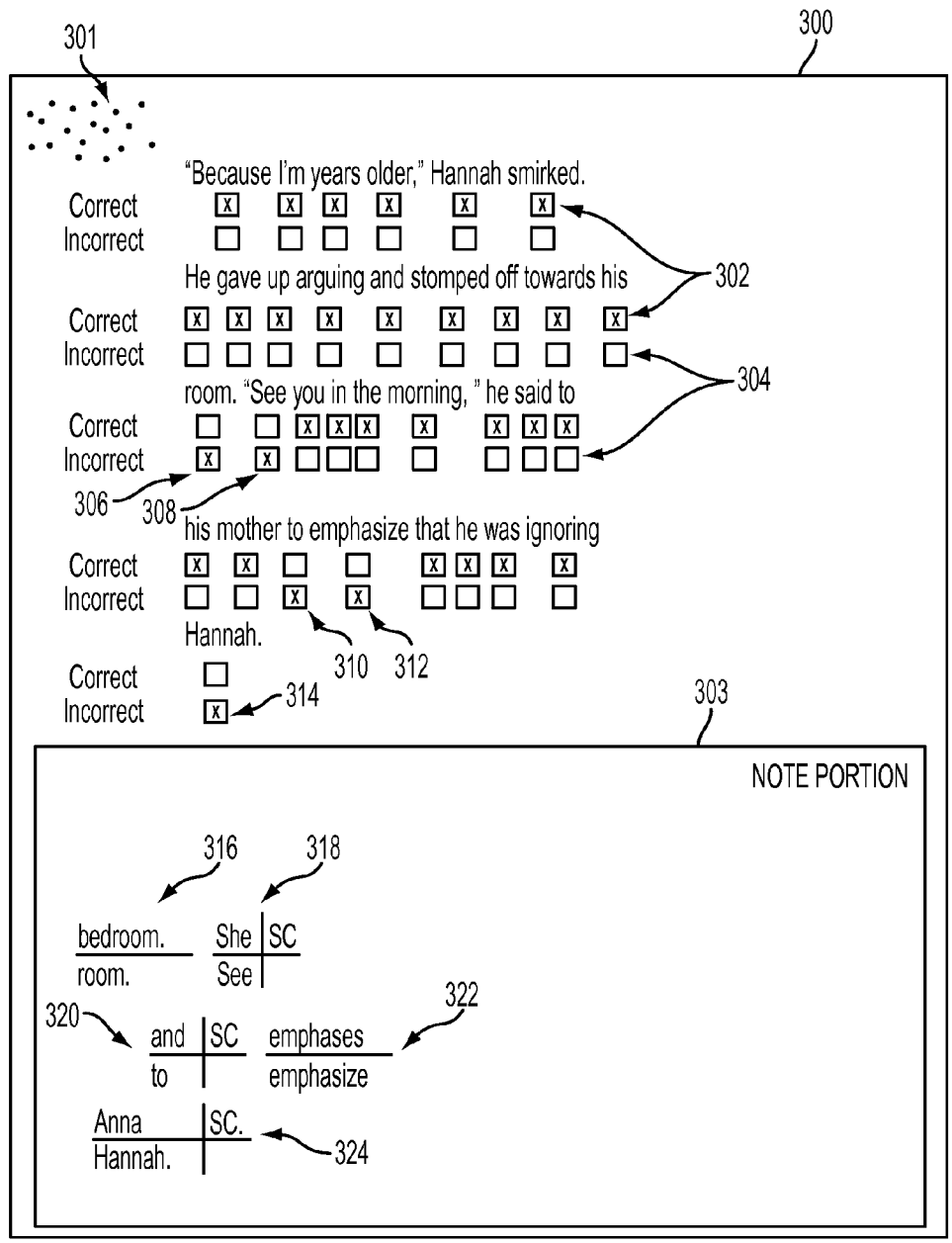
FIG. 3 shows an intelligent running record worksheet.

Referring now to FIG. 3, a worksheet 300 is shown that is generated using the methods described herein. In a scenario, the worksheet file is generated on a computer and output to a printer to print the worksheet on a substrate. The worksheet file includes a position-identifying pattern 301. The position-identifying pattern illustrated in FIG. 1 is merely for the purpose of illustration, and not necessarily representative of an actual pattern. For example, the pattern may extend throughout the entire page, and it may be so small as to be not detectable by the unaided human eye. In some embodiments, the position-identifying pattern 301 may be similar to that described in U.S. patent application Ser. No. 13/362,694, filed Jan. 31, 2012, the contents of which are fully incorporated by reference. A digital pen, e.g. digital pen 101 of FIG. 1, is capable of capturing data embedded within a position-identifying pattern printed on worksheet 300, such as position-identifying pattern 301. The worksheet also includes a plurality of indicator regions. A region is any defined area on the worksheet. The region may be defined through reference to a position identifying pattern and may not be otherwise visible. Alternatively, they may be defined visibly, e.g. with boxes 302 illustrated in FIG. 3. The scenarios described herein are not limited in this regard.

In the scenario shown in FIG. 3, an indicator region is generated for each word in the reading passage. Each indicator region corresponds to an indicator portion of the position-identifying pattern. Therefore, each indicator portion of the position-identifying pattern is associated with a word. In the scenario of FIG. 3, indicator regions are generated for each word including a plurality of "correct" regions 302 and "incorrect" regions 304. In this scenario, two indicator regions are generated for each word, although the scenarios of the present disclosure are not limited in this regard. For example, only one of the regions may be used, or additional indicator regions may be used. Each indicator region (i.e., each of "correct" regions 302 and each of "incorrect" regions 304) corresponds to an indicator portion of the position-identifying pattern that identifies the position of each indicator region on the page. A teacher can mark the correct region 302 of a word if the child reads that word correctly. A teacher can mark the incorrect region 304 of a word if the child reads that word incorrectly.

The worksheet 300 also includes a note region 303. Although a defined portion of the page is designated as note region 303 in FIG. 3, one of skill in the art will recognize that the note region may be any part of the page that is not containing an indicator region. The note region 303 corresponds to any portion of the position-identifying pattern in which the teacher enters a note, which is referred to in this document as a "note region." The note region may be a predefined area, or it may be any area in which a note is entered. If the entire page, except the indicator regions, is defined as the note region, then the note portion of the position-identifying pattern includes all of the pattern that does not correspond to an indicator region.

As shown in FIG. 3, the same reading passage is printed on the worksheet 300 so that each word is printed. In a scenario, a teacher using worksheet 300 can use various indicator regions to mark each word as correct or incorrect. For example, boxes 306, 308, 310, 312, 314 are "incorrect" regions that, when a mark is made in the region, all indicate that student incorrectly read the words associated with those respective boxes. Although each word is marked with an "X" in the appropriate box, any mark or tap will be sufficient. Through the use of a digital pen, e.g. digital pen 101 of FIG. 1, that is capable of capturing data embedded within a position-identifying pattern printed on worksheet 300, such as position-identifying pattern 301, the teacher may tap the region or otherwise activate the optical sensor to enable the optical sensor on the digital pen to detect the position-identifying pattern associated with the selected ("tapped") box. Physical marking of the worksheet is not required. As used herein, the term "mark" broadly includes any contact between the pen and the worksheet sufficient to identify the position of the pen tip on the worksheet. No physical mark need be made.

In one scenario, a student reads the reading passage shown on worksheet 300. As the student reads the passage aloud, an audio capture device records an audio file of the student's reading performance. The audio capture device may be a component of the digital pen or another audio capture device that is, along with the digital pen, in electronic communication with a computing device. The electronic communication may occur in real-time as the audio capture device captures signals, or it may be delayed such as by batch processing or after the audio capture device and computing device are linked. As the teacher listens to the student read (either live or during playback of the recording), the teacher makes a mark for each word in the passage printed on the worksheet 300, by either marking the "correct" region 302 or the "incorrect" region 304 for that word. As the teacher marks each box, the digital pen detects the portion of the position identifying pattern 301 that corresponds with the marked box. For example, when the teacher marks the "incorrect" indicator region 306 for the word "room," the digital pen detects, associates, and stores data indicating that the student has made an error for the word and data comprising all marks made by the pen on the worksheet until the teacher marks a different indicator region is marked. In other words, after the teacher marks or selects indicator region 306, the system associates the word "room" with all subsequently made marks until the teacher marks or selections another indicator region. This process is described more fully below. In addition, the digital pen may also store a time stamp indicating the point in time during the recording when the teacher marked the region 306 for the word "room." After the reading session is over, the teacher may then replay the recording starting from the point in time when the student read that word by tapping region 306, again.

In this scenario, after the teacher marks the region 306, and the digital pen detects an indicator portion of the position-identifying pattern corresponding to region 306, all subsequent marks that are not made in an indicator region are associated with the word "room." For example, the teacher makes note 316 in the note region 303 of worksheet 300. The teacher uses a standard notation to indicate that the student made an uncorrected error in their reading. The notation indicates that, instead of "room" (written on the bottom of the note), the student said "bedroom" (written on the top of the note). The entire notation 316 is associated with the word "room," and data representing the notation 316 is stored by the digital pen for later processing and review. Similarly, notes 318, 320, 322, and 324 are stored and associated with the incorrect regions 308, 310, 312, and 314 respectively. Therefore, when the teacher marks region 308, all marks (i.e. note 318) is stored and associated with the word "See." When the teach marks region 310, note 320 is stored and associated with the word "to," and so on.

In another scenario, the digital pen is in communication with a computing device (not shown in FIG. 3). In this scenario, the digital pen captures data from the position-identifying pattern 301 and relays the captured data to the computing device for processing and/or storage. In addition, the pen may use indicia on the worksheet to identify the worksheet and retrieve the worksheet's corresponding file from its own memory or from that of an external computing device. As indicated above, the digital pen may have a microphone or other audio capturing device to record audio. Alternatively, the computing device may be in communication with a microphone or other audio capturing device that records audio. In this alternative scenario, an application executing on the computing device may conduct all the processing described herein. For example, the computing device may store data and associate time stamps and notations to individual words, instead of the digital pen. The scenarios of this disclosure are not limited in this regard.

Figure 4:
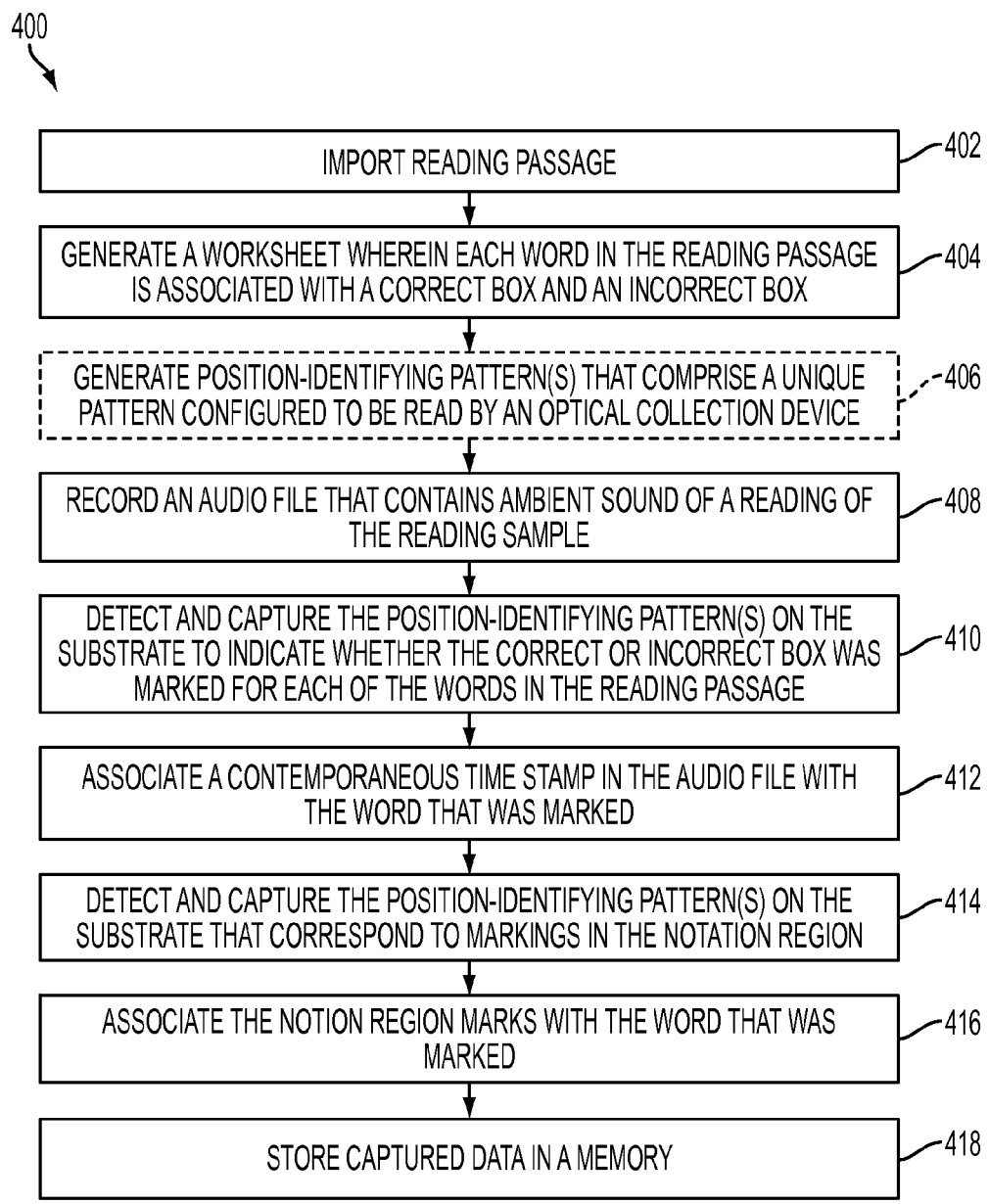
FIG. 4 is a flowchart of a method for generating and using an intelligent running record worksheet

FIG. 4 illustrates a method 400 of generating and using a running record worksheet and a digital pen in accordance with the present disclosure. Method 400 may be implemented in a software application running on a general purpose computer or other computing device. Referring to FIG. 4, a reading passage is imported into the software or computing device 402. The passage may be imported in any manner now known or to be discovered. For example, the passage may be typed, pasted, or selected from a pre-defined from a standard reading curriculum or from any other source. A worksheet is generated from the imported reading passage 404. In the worksheet, each word from the reading passage is associated with a pair of indicator boxes, one indicating a correct reading and one indicating an incorrect reading. The software application parses each word in the reading passage and creates an indicator region such as an indicator box pair (e.g. one region 302 and one region 304, as shown in FIG. 3).

Optionally, a position-identifying pattern is generated 406. The pattern may be generated using the reading passage or may be pre-generated. The pattern may be pre-printed on the paper or may be printed with the worksheet. As long as the portions of the position-identifying pattern contain the indicator regions, any method of printing the position-identifying pattern is sufficient. The generated worksheet may then be printed out on paper for use as a running record worksheet. The printing may be done by a laser printer, inkjet printer, and/or any other printing device which may use any method of applying a permanent pattern of position-identifying data on the paper so long as the printing is done in a manner that can be detected by the digital pen. The worksheet may also include indicia, such as a barcode or other type of machine readable indicia, that allow the worksheet to be identified. For example, a teacher may wish to recall the worksheet file and/or audio recording of a particular session. In this scenario, the teacher may use the digital pen to read a barcode or other indicia. The digital pen would then access, or instruct a computing device to access, a data storage facility to retrieve the worksheet file and/or audio file for review.

The digital pen, or another audio capture device in communication with the digital pen and/or with a computing device, records an audio file containing ambient sound that includes a student's reading of the imported reading sample 408. The audio file may be recorded by the digital pen, e.g. with digital pen 101 using audio sensor 122 as shown in FIG. 1. The teacher may start the recording at any time. It may be started through direct input such as a button push, or may start when the digital pen detects a particular portion of the position-identifying pattern.

An image-capturing sensor on the digital pen or other image-capturing device captures data representing the position of markings in an indicator region associated with a word that is printed on the paper 410. The portion of the position-identifying pattern that corresponds to the indicator region that is marked by the teacher in response to the student's reading of a word. Although the teacher may mark the region, it is not required that they do so. The teacher may tap the indicator region so that the image-capturing sensor is capable of detecting which indicator region is selected. Since each indicator region is associated with a word in the reading passage, the initial mark or tap on an indicator region during a running record session has the effect of associating a particular word with a particular moment in time. Additionally, after a mark has been made in an indicator region, any subsequent mark in the note portion of the worksheet is associated with the word corresponding to the indicator region. All marks made will continue to be associated with that word until an indicator region corresponding to another word is marked.

A time stamp may be stored when the indicator region (e.g. incorrect region 306 as shown in FIG. 3) is checked by the teacher 412. The time stamp may be used to relate the teacher's initial marking of an indicator region with a particular point in the audio recording. For example, the time stamp may relate to the sample number of the audio sample stored within the digital audio file. Each sample of a digital audio file corresponds to a particular time. Therefore a particular sample, or sequential group of samples, corresponds to a particular moment in time in the audio recording. However, any method of indexing or time-stamping a digital audio file may be used. Once the time stamp is determined and stored, the time stamp is associated with the word corresponding to the indicator region that was marked by the teacher. For example, when region 306 is initially marked by the teacher, a particular moment in the audio file is time-stamped and associated with the word "room."

The image-capturing sensor detects and captures the portions of the handwritten markings made by the teacher in the note portion of the worksheet 414. As discussed above, a tap or mark in an indicator region associates any subsequent mark in the notation portion of the worksheet with the word corresponding to the marked indicator region. Therefore, the handwritten marks are associated with the previously marked word 416. The handwritten markings data is stored in a memory, e.g., as a digital document 418. The digital document may be a portable document format (PDF) document, a word processing format, or some other document format suitable for storing, viewing, searching, and editing handwritten digital documents. Optionally, the digital document or the data representing the handwritten markings may be transferred to a computing device for processing, storage and/or viewing.

Figure 5:
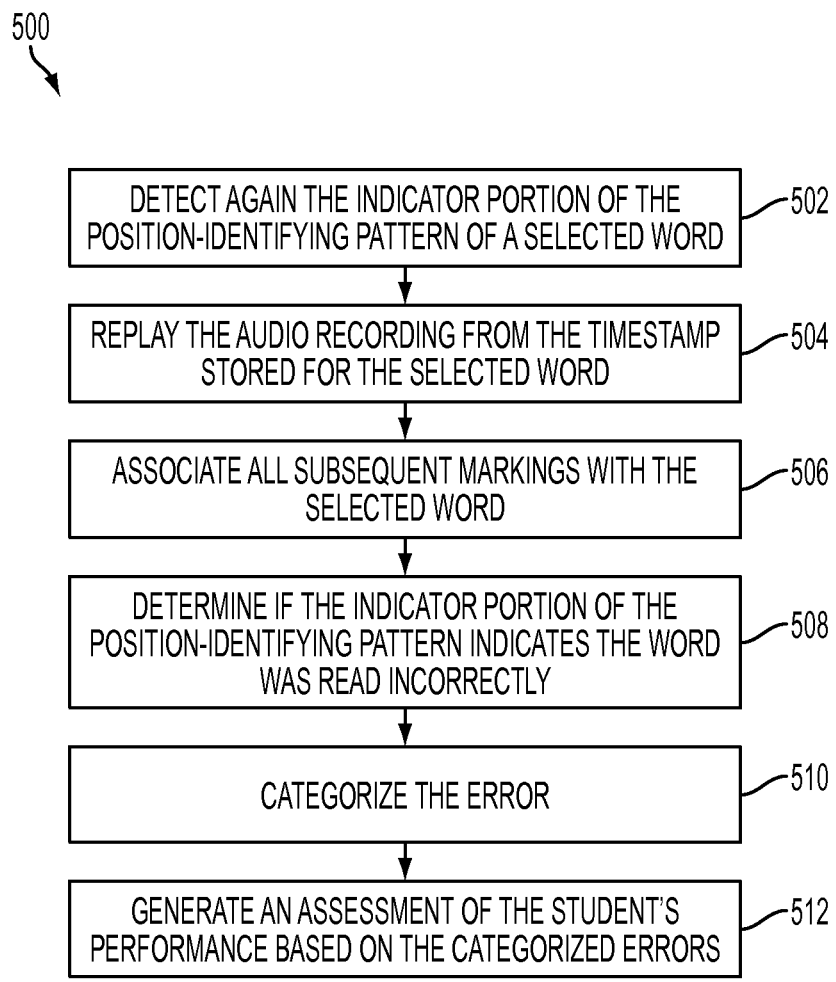
FIG. 5 is a flowchart of a method for reviewing and analyzing the results of a running record session.

FIG. 5 illustrates a detailed method of using the digital pen to further analyze a student's reading performance after a running record session has been completed. For example, after a session has been completed, a teacher may wish to add more information to one or more of the notations or add a new notation all together. An indicator region is detected by the image-capturing sensor 502. The indicator region corresponds to a particular word in the reading passage. The digital audio file is replayed from the time indicated in the time-stamp 504. When an indicator region (and a word corresponding to that indicator region) is selected, a time stamp in an audio file stored on the digital pen or other computing device is recalled. This time stamp indicates the location in the audio file where the student read the selected word. This allows the teacher to make additional notations in the note portion of the worksheet while listening to the student's reading performance.

All subsequent markings made in the note portion of the worksheet are associated with the selected word 506. Since each indicator region is associated with only one word, the selection of an indicator region, for example region 306 of FIG. 3, allows all subsequent markings to be associated with that particular word, e.g. "room." The notations made in the note region are also associated with the location in the audio file wherein the student read the selected word.

The system can use the mark to generate a reading assessment result indicating whether the child's reading of the word was correct or incorrect 508. If so, the error may be categorized by analyzing the teacher's handwritten notations 510. The notations may indicate whether the student self-corrected the error ("SC"), corrected the error after teacher prompting, or did not correct the error. As noted above, common errors can be easily determined based on the notation made. For example, an uncorrected error can be identified when there is no "SC" in the notation to indicate that the student self-corrected the error. Conversely, a self-corrected error can be identified when there is an "SC" in the notation. A re-read can be identified when the teacher marks a series of words as correct, then backtracks and selects the same words again. Referring to FIG. 2, a re-read is indicated by mark 208 and the arrow directing back to the beginning of the passage that was re-read. The system shown in FIG. 3 advantageously avoids the necessity of specifically noting a re-read. As shown in FIG. 3, when the words "I'm years older" are re-read, the teacher need only tap the correct indicator regions for those words again, indicating that they have been repeated by the student. The digital pen will be able to identify that as a re-read. One of skill in the art will recognize that there may be many other categorizations of reading errors other than those provided above. The present disclosure is not limited in this regard.

Referring again to FIG. 5, an assessment of the student's performance can be generated based on the categorized errors described above 512. For example, a software application that is performing the actions described above may create a report that compiles a count and description of a student's errors in a particular reading session. The system may analyze the teacher's notes for the purpose of generating this report. The system also may capture the recording and teacher's notations and output a document or display a file that shows words which the teacher has not yet annotated, so that the teacher can fill in missing information. For example, it may create a score using an algorithm that is based on the number of errors made or correct answers provided. Or, it may also list the errors made, and/or weigh each error in the score based on the complexity of the word. For example, in the score, a simple word may be given a score of 1 if read correctly, while a complex word may be given a higher score. The score of each word also may be adjusted based on the teacher's notes corresponding to the word. For example, a single word that is read incorrectly at first, but later self-corrected, may be given a score of 2, while a word that is not read correctly at all may be assigned a higher score.

Figure 6:
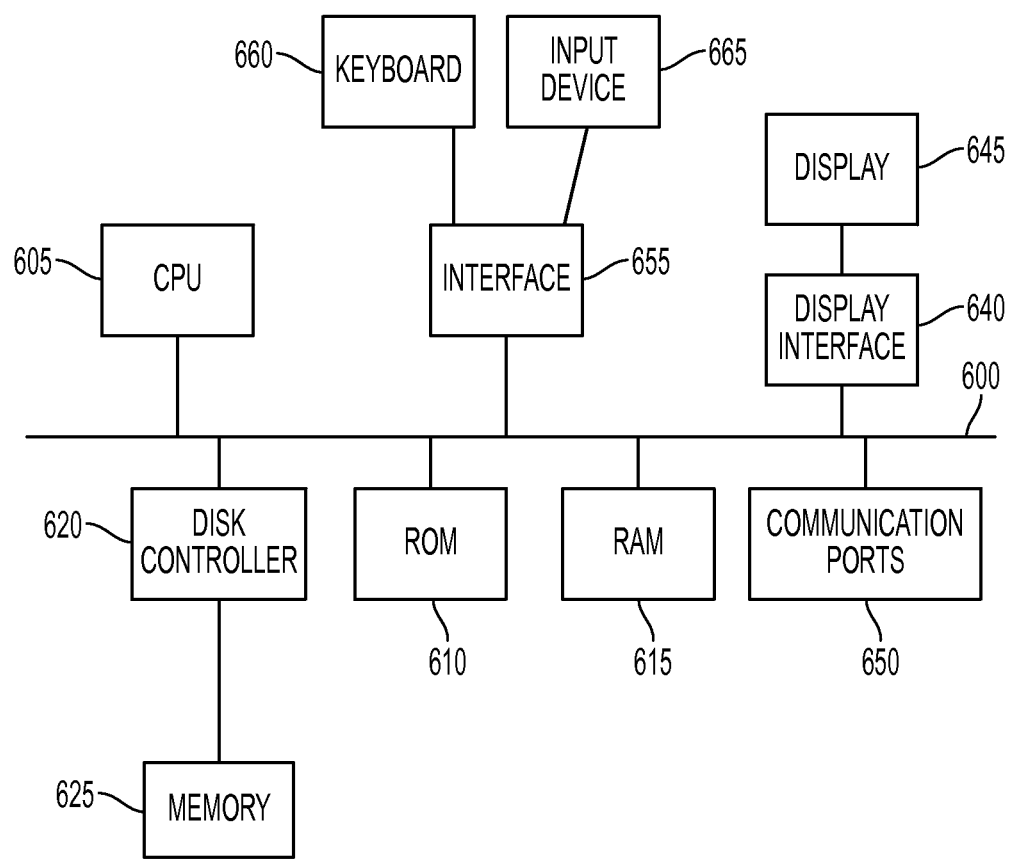
FIG. 6 is a block diagram of a computing device in accordance with embodiments of the present disclosure.

FIG. 6 depicts a block diagram of internal hardware that may be used to contain or implement the process discussed above. A bus 600 serves as the main information highway interconnecting the other illustrated components of the hardware. CPU 605 is a processor, the central processing unit of the system that performs calculations and logic operations required to execute a program. CPU 605, alone or in conjunction with one or more of the other elements disclosed in FIG. 6, is a processing device, computing device or processor as such terms are used within this disclosure. Read only memory (ROM) 610 and random access memory (RAM) 615 constitute exemplary memory devices.

A controller 620 provides an interface between with one or more optional tangible, computer-readable memory devices 625 and the system bus 600. These memory devices 625 may include, for example, an external or internal DVD or CD ROM drive, a hard drive, flash memory, a USB drive or the like. As indicated previously, these various drives and controllers are optional devices. Additionally, the memory devices 625 may be configured to include individual files for storing any software modules or instructions, auxiliary data, common files for storing groups of results or auxiliary, or one or more databases for storing the result information, auxiliary data, and related information as discussed above.

Program instructions, software or interactive modules for performing any of the methods and systems as discussed above may be stored in the ROM 610 and/or the RAM 615. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 640 may permit information from the bus 600 to be displayed on the display 645 in audio, visual, graphic or alphanumeric format. The information may include information related to a current job ticket and associated tasks. Communication with external devices may occur using various communication ports 650. A communication port 650 may be attached to a communications network, such as the Internet or an local area network.

The hardware may also include an interface 655 which allows for receipt of data from input devices such as a keyboard 660 or other input device 665 such as a digital pen as described above, a mouse, a joystick, a touch screen, a remote control, a pointing device, a video input device and/or an audio input device.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A student reading performance assessment system, comprising:
   a worksheet having a position-identifying pattern configured to be read by an image-capturing device printed thereon, the worksheet comprising:
      a plurality of indicator regions, each comprising at least one indicator portion of the position-identifying pattern;
      a plurality of words each associated with at least one of the indicator regions; and
      a note region, comprising a note portion of the position-identifying pattern; and
   a digital pen capable of both writing on a substrate and capturing data corresponding to a user's handwriting, the digital pen comprising an image-capturing sensor, a processor, and a tangible, computer-readable memory with instructions that, when executed, cause the processor to:
      associate a first mark and a first notation on a worksheet comprising a position-identifying pattern with a first word by:
         detecting, by the image-capturing sensor, a first indicator portion of the position-identifying pattern corresponding to a first mark in a first one of the indicator regions that is associated with a first word,
         after detecting the first indicator portion, detecting, by the image-capturing device, a first note portion of the position-identifying pattern corresponding to a first notation in the note region, and
         after the first indicator portion of the position-identifying pattern is detected by the image-capturing sensor, associating all subsequently detected portions of the position-identifying pattern in the first indicator region and the note region of the worksheet and the corresponding marks and notations with the first word until another indicator portion of the position-identifying pattern that corresponds to another word is detected by the image-capturing sensor;
      based on whether the first mark indicates that the first word was read incorrectly or correctly, determine a first reading assessment result for the first word, and
      store, in a memory, a digital document file comprising the first reading assessment result, the marks and notations associated with the first word, and information identifying where on the worksheet the markings and notations associated with the first word are located.

2. The system according to claim 1, wherein the instructions, when executed, cause the processor to:
   associate a second mark and a second notation on the worksheet with a second word by:
      detecting, by the image-capturing sensor, a second indicator portion of the position-identifying pattern corresponding to a second mark in a second one of the indicator regions that is associated with a second word; and
      detecting, by the image-capturing sensor, a second note portion of the position-identifying pattern corresponding to a second notation in the note region,
   based on whether the second mark indicates that the second word was read incorrectly or correctly, determine a second reading assessment result for the second word; and include the second reading assessment result, the marks and notations associated with the second word, and information identifying where on the worksheet the markings and notations associated with the second word are located in the digital document file.

3. The system according to claim 2, wherein the instructions, when executed, cause the processor to:
after the first indicator portion is detected by the image-capturing sensor, associate all subsequently detected portions of the position-identifying pattern and the corresponding marks with the first word until the second indicator portion is detected; and
after the second indicator portion is detected, associate all subsequently detected portions of the position-identifying pattern and the corresponding marks with the second word until another indicator portion is detected.

4. The system according to claim 2, wherein the digital pen further comprises an audio-capturing sensor, and wherein the instructions, when executed, cause the processor to:
record, by the audio-capturing sensor, ambient sound in a digital audio file; and
store the digital audio file in the memory.

5. The system according to claim 4, wherein the instructions, when executed, cause the processor to:
when the first indicator portion is initially detected, store a first time-stamp associating the first indicator portion with a first portion of the digital audio file that contains a recording of the first word; and
after completing the reading assessment:
on a condition that the first indicator portion is detected again by the image-capturing sensor, replay the first portion of the digital audio file that begins at the first time-stamp; and
associate all portions of the position-identifying pattern that are detected subsequent to the first indicator portion being detected again and corresponding marks with the first word until another indicator portion of the position-identifying pattern that corresponds with another word is detected.

6. The system according to claim 2, wherein the instructions, when executed, cause the processor to:
on a condition the first indicator portion indicates an error for the first word, categorize the error for the first word based on the first mark and the first note portion; and
generate an assessment based on the categorized errors for the plurality of words for which a mark was detected in the note region.

7. The system according to claim 2, wherein the instructions, when executed, cause the processor to:
on a condition that the first and second indicator portions are detected in a sequence that indicates that the first and second words were repeated, categorize the error for the second word as a re-read without reference to the first note portion; and
generate an assessment based on the categorized errors for the plurality of words for which a re-read was detected.

8. The system according to claim 2, wherein the instructions, when executed, instruct the processor to use the first reading assessment result, the second reading assessment result, the first note and the second note to generate a reading assessment report.

9. A method for assessing a student's reading ability, the method comprising:
associating a first mark and a first notation on a worksheet comprising a position-identifying pattern with a first word by:
detecting, by a digital pen capable of both writing on a substrate and capturing data corresponding to a user's handwriting, a first mark in a first region of the worksheet, wherein the first mark is in a first indicator portion of the position-identifying pattern contained within a first indicator region that is associated with a first word, wherein the digital pen comprises an image-capturing sensor,
after detecting the first mark, detecting, by the image-capturing sensor, a first note portion of the position-identifying pattern corresponding to a first notation in a note region of the worksheet, and
associating all subsequently detected portions of the position-identifying pattern in the first region and the note region of the worksheet and the corresponding marks and notes with the first word until another indicator portion of the position-identifying pattern that corresponds with another word is detected;
based on whether the first mark, the first notation, or both indicates that the first word was read incorrectly or correctly, determining a first reading assessment result for the first word; and
storing, in a memory, a digital document file comprising the first reading assessment result, the marks and notations associated with the first word, and information identifying where on the worksheet the markings and notations associated with the first word are located.

10. The method according to claim 9, further comprising:
detecting, by the image-capturing sensor, a second mark in a second region of the worksheet, wherein the second region is in a second indicator portion of the position-identifying pattern, in which the second indicator portion corresponds to a correct region or an incorrect region associated with a second word;
detecting, by the image-capturing sensor, a second note in the note region;
based on whether the second mark, the second note, or both indicates that the second word was answered incorrectly or correctly, determine a second assessment result for the second word; and
including the second reading assessment result, the marks and notations associated with the second word, and information identifying where on the worksheet the markings and notations associated with the second word are located in the digital document file.

11. The method according to claim 10, further comprising:
on a condition that the first indicator portion of the position-identifying pattern is detected again by the image-capturing sensor, associating all subsequently detected portions of the position-identifying pattern and the corresponding marks with the first word until another indicator portion of the position-identifying pattern that corresponds with another word is detected.

12. The method according to claim 10 wherein the digital pen further comprises an audio-capturing sensor, the method further comprising:
recording, by the audio-capturing sensor, ambient sound in a digital audio file; and
storing the digital audio file in a memory.

13. The method according to claim 12, further comprising:
when the first indicator portion is first detected, store a first time-stamp associating the first indicator portion with a first portion of the digital audio file that contains a recording of the first word.

14. The method according to claim 13, further comprising:
  on a condition that the first indicator portion is detected again by the image-capturing sensor, replay the first portion of the digital audio file that begins at the first time-stamp.

15. The method according to claim 9, further comprising:
  on a condition the first indicator portion corresponds to the incorrect region for the first word, categorize an error for the first word as one of an uncorrected error, a self-corrected error, or a re-read based on the first mark.

16. The method according to claim 9, further comprising:
  generating an assessment based on the categorized errors for the plurality of words for which a mark was detected in the note region.

17. The method according to claim 10, further comprising using the first reading assessment result, the second reading assessment result, the first note and the second note to generate a reading assessment report.

18. The method according to claim 9, further comprising:
  generating a position-identifying pattern that, when printed on a substrate, yields a unique pattern configured to be read by the optical collection device.

19. The method according to claim 18, further comprising generating a worksheet file that comprises a digital representation of the worksheet.

20. The system of claim 1 wherein the position-identifying pattern covers the entire worksheet.

21. The method of claim 18, wherein the generated position-identifying pattern is pre-printed on the entire worksheet.

* * * * *